United States Patent
Wang et al.

(10) Patent No.: US 9,477,677 B1
(45) Date of Patent: Oct. 25, 2016

(54) SYSTEMS AND METHODS FOR PARALLEL CONTENT-DEFINED DATA CHUNKING

(71) Applicant: Symantec Corporation, Mountain View, CA (US)

(72) Inventors: Wenxin Wang, Beijing (CN); Xianbo Zhang, Plymouth, MN (US); Dongxu Sun, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 698 days.

(21) Appl. No.: 13/889,118

(22) Filed: May 7, 2013

(51) Int. Cl.
*G06F 7/00* (2006.01)
*G06F 17/30* (2006.01)

(52) U.S. Cl.
CPC ................ *G06F 17/30156* (2013.01)

(58) Field of Classification Search
CPC ................ G06F 3/0641; G06F 17/30156
USPC ........................................................ 707/692
See application file for complete search history.

(56) References Cited

U.S. PATENT DOCUMENTS

| | | | | |
|---|---|---|---|---|
| 7,272,658 | B1* | 9/2007 | Edelman | H04L 47/10 709/219 |
| 8,195,629 | B2* | 6/2012 | Tofano | G06F 3/0641 707/694 |
| 2008/0291984 | A1* | 11/2008 | Heise | H03M 13/2732 375/219 |
| 2010/0246709 | A1* | 9/2010 | Lillibridge | G06F 17/30988 375/295 |
| 2010/0328116 | A1* | 12/2010 | Chin | H04J 3/047 341/100 |
| 2011/0307659 | A1* | 12/2011 | Hans | G06F 3/0613 711/114 |
| 2012/0089775 | A1* | 4/2012 | Ranade | H03M 7/3091 711/113 |

OTHER PUBLICATIONS

Xia, Wen et al., "Accelerating Data Deduplication by Exploiting Pipelining and Parallelism with Multicore or Manycore Processors", http://static.usenix.org/events/fast/poster_descriptions/Xiadescription.pdf, as accessed on Feb. 7, 2013, Proceedings of the 10th USENIX Conference on File and Storage Technologies (FAST'12), USENIX Association, San Jose,(2012).
Wen Xia, et al; P-Dedupe: Exploiting Parallelism in Data Deduplication System; 2012 IEEE Seventh International Conference on Networking, Architecture, and Storage; 2012; pp. 338-347; IEEE Computer Society.

\* cited by examiner

*Primary Examiner* — Cheyne D Ly
(74) *Attorney, Agent, or Firm* — ALG Intellectual Property, LLC

(57) ABSTRACT

A computer-implemented method for parallel content-defined data chunking may include (1) identifying a data stream to be chunked, (2) splitting the data stream into a plurality of data sub-streams by alternatingly dividing consecutive bytes of the data stream among the plurality of data sub-streams, and (3) chunking, in parallel, each data sub-stream within the plurality of data sub-streams into a plurality of data segments using a content-defined chunking algorithm. Various other methods, systems, and computer-readable media are also disclosed.

20 Claims, 13 Drawing Sheets

SYSTEMS AND METHODS FOR PARALLEL CONTENT-DEFINED DATA CHUNKING

BACKGROUND

Deduplicated data systems are often able to reduce the amount of network and storage resources required to transmit and store data by recognizing redundant data patterns. For example, a deduplicated data system may reduce the amount of storage space required to backup similar files by (1) chunking (e.g., dividing) each of the files into a plurality of data segments, (2) identifying redundant (i.e., identical) data segments from within the plurality of data segments, and then (3) storing only those data segments that are unique (i.e., non-redundant).

Conventional deduplicated data systems typically use content-defined chunking algorithms (e.g., the Rabin fingerprinting algorithm) to chunk data into data segments based on the content of the data. To improve content-defined chunking performance, some deduplicated data systems may attempt to parallelize content-defined chunking calculations by (1) dividing data streams into multiple sections that are each large enough to include many data segments and then (2) chunking, in parallel, each section into a plurality of data segments. Unfortunately, deduplicated data systems that parallelize content-defined chunking in this manner may require large amounts of memory and may suffer from low concurrency because chunking calculations performed at the boundaries of any two sections may require data from both sections. Accordingly, the instant disclosure addresses a need for additional and improved systems and methods for parallel content-defined data chunking.

SUMMARY

As will be described in greater detail below, the instant disclosure generally relates to systems and methods for parallel content-defined data chunking by reorganizing data streams into multiple data sub-streams and chunking the data sub-streams in parallel. In one example, a computer-implemented method for parallel content-defined data chunking may include (1) identifying a data stream to be chunked, (2) splitting the data stream into a plurality of data sub-streams by alternatingly dividing consecutive bytes of the data stream among the plurality of data sub-streams, and (3) chunking, in parallel, each data sub-stream within the plurality of data sub-streams into a plurality of data segments using a content-defined chunking algorithm.

In some examples, the computer-implemented method may further include storing the data stream by individually storing each data segment within the plurality of data segments of each data sub-stream within the plurality of data sub-streams.

In certain examples, the computer-implemented method may further include (1) receiving, after storing the data stream, a request for the data stream, (2) identifying, in response to the request, the plurality of data segments of each data sub-stream within the plurality of data sub-streams, (3) reconstructing each data sub-stream within the plurality of data sub-streams from the plurality of data segments of each data sub-stream within the plurality of data sub-streams, (4) reconstructing the data stream from the plurality of reconstructed data sub-streams, and (5) responding to the request for the data stream with the reconstructed data stream.

In at least one example, the step of storing the data stream by individually storing each data segment within the plurality of data segments of each data sub-stream within the plurality of data sub-streams may include storing only unique data segments within the plurality of data segments of each data sub-stream within the plurality of data sub-streams.

In some examples, the step of splitting the data stream into the plurality of data sub-streams may include alternatingly dividing consecutive bytes of the data stream among a plurality of data buffers, wherein each data buffer within the plurality of data buffers may have a size equal to the maximum size of data segments identified by the content-defined chunking algorithm.

In other examples, the step of chunking each data sub-stream within the plurality of data sub-streams may include beginning to chunk at least one data sub-stream within the plurality of data sub-streams when one segment marker could be identified within the data sub-stream.

In some examples, each data sub-stream within the plurality of data sub-streams may be chunked by a separate thread of execution. In at least one example, the data stream may include at least one file that is to be deduplicated.

In one embodiment, a system for implementing the above-described method may include (1) an identifying module that identifies a data stream to be chunked, (2) a splitting module that splits the data stream into a plurality of data sub-streams by alternatingly dividing consecutive bytes of the data stream among the plurality of data sub-streams, (3) a chunking module that chunks, in parallel, each data sub-stream within the plurality of data sub-streams into a plurality of data segments using a content-defined chunking algorithm, and (4) at least one processor configured to execute the identifying module, the splitting module, and the chunking module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a data stream to be chunked, (2) split the data stream into a plurality of data sub-streams by alternatingly dividing consecutive bytes of the data stream among the plurality of data sub-streams, and (3) chunk, in parallel, each data sub-stream within the plurality of data sub-streams into a plurality of data segments using a content-defined chunking algorithm.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
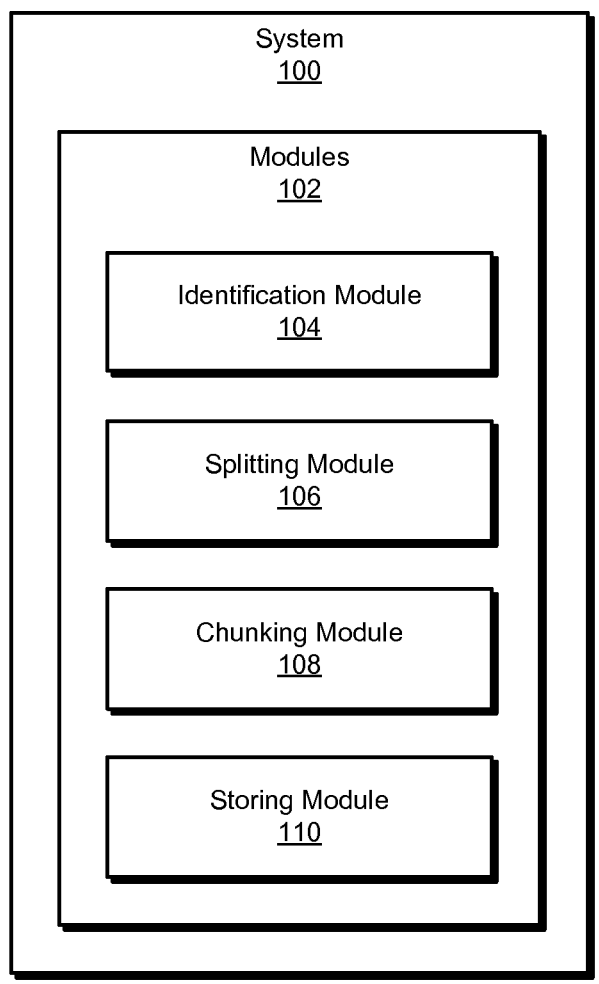
FIG. 1 is a block diagram of an exemplary system for parallel content-defined data chunking.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for parallel content-defined data chunking. As will be explained in greater detail below, by (1) alternatingly dividing consecutive bytes of data streams among multiple data sub-streams and (2) chunking the data sub-streams instead of the data streams, the systems and methods described herein may perform parallel content-defined data chunking without consuming large amounts of memory and without sacrificing concurrency. Embodiments of the instant disclosure may also provide various other advantages and features, as discussed in greater detail below.

Figure 2:
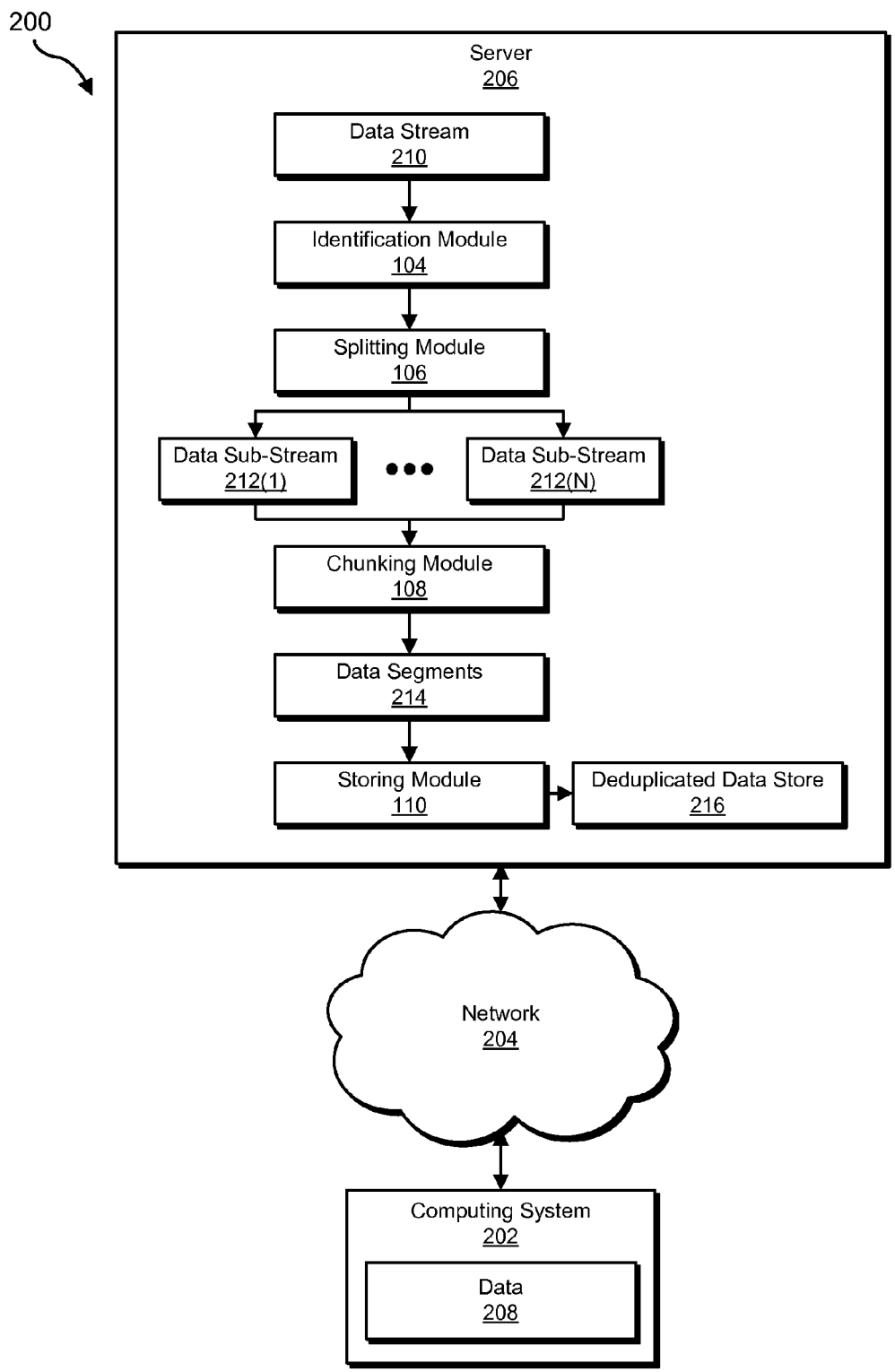
FIG. 2 is a block diagram of an exemplary system for parallel content-defined data chunking.

The following will provide, with reference to FIGS. 1-2, detailed descriptions of exemplary systems for parallel content-defined data chunking. Detailed descriptions of corresponding computer-implemented methods will also be provided in connection with FIGS. 3-11. In addition, detailed descriptions of an exemplary computing system and network architecture capable of implementing one or more of the embodiments described herein will be provided in connection with FIGS. 12 and 13, respectively.

FIG. 1 is a block diagram of an exemplary system 100 for parallel content-defined data chunking. As illustrated in this figure, exemplary system 100 may include one or more modules 102 for performing one or more tasks. For example, and as will be explained in greater detail below, exemplary system 100 may include an identification module 104 that identifies a data stream to be chunked. Exemplary system 100 may also include a splitting module 106 that splits the data stream into a plurality of data sub-streams by alternatingly dividing consecutive bytes of the data stream among the plurality of data sub-streams.

In addition, and as will be described in greater detail below, exemplary system 100 may include a chunking module 108 that chunks, in parallel, each data sub-stream within the plurality of data sub-streams into a plurality of data segments using a content-defined chunking algorithm. Exemplary system 100 may also include a storage module 110 that stores the data stream by individually storing each data segment within the plurality of data segments of each data sub-stream within the plurality of data sub-streams. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or server 206), computing system 1210 in FIG. 12, and/or portions of exemplary network architecture 1300 in FIG. 13. One or more of modules 102 in FIG. 1 may also represent all or portions of one or more special-purpose computers configured to perform one or more tasks. In at least one example, one or more of modules 102 in FIG. 1 may represent all or portions of a deduplicated data system. The term "deduplicated data system," as used herein, generally refers to storage systems that reduce redundant data by only storing non-redundant instances of data (e.g., unique data segments), potentially referencing each data segment multiple times. Examples of deduplicated data systems may include SYMANTEC's NETBACKUP PUREDISK.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 202 in communication with a server 206 via a network 204. Computing system 202 may be programmed with one or more of modules 102. Additionally or alternatively, server 206 may be programmed with one or more of modules 102.

In one embodiment, one or more of modules 102 from FIG. 1 may, when executed by at least one processor of computing system 202 and/or server 206, facilitate computing system 202 and/or server 206 in parallel content-defined data chunking. For example, and as will be described in greater detail below, one or more of modules 102 may cause computing system 202 and/or server 206 to (1) identify a data stream 210 to be chunked, (2) split data stream 210 into data sub-streams 212(1)-(N) by alternatingly dividing consecutive bytes of data stream 210 among data sub-streams 212(1)-(N), and (3) chunk, in parallel, each data sub-stream within data sub-streams 212(1)-(N) into data segments 214 using a content-defined chunking algorithm. In at least one example, one or more of modules 102 may cause server 206 to store data stream 210 by individually storing data segments 214 to deduplicated data store 216.

Computing system 202 generally represents any type or form of computing device capable of reading computer-executable instructions. Examples of computing system 202 include, without limitation, laptops, tablets, desktops, servers, cellular phones, Personal Digital Assistants (PDAs), multimedia players, embedded systems, combinations of one or more of the same, exemplary computing system 1210 in FIG. 12, or any other suitable computing device. As shown in FIG. 2, computing system 202 may include data 208. Data 208 may represent any data accessible via computing system 202. For example, data 208 may represent files, folders, and/or volumes accessible via computing system 202. In at least one example, data 208 may represent data that is to be deduplicated as part of being backed up and/or archived to server 206.

Server 206 generally represents any type or form of computing device that is capable of reading computer-executable instructions. Examples of server 206 include, without limitation, application servers and database servers configured to provide various database services and/or run certain software applications. As shown in FIG. 2, server 206 may include deduplicated data store 216. In at least one example, deduplicated data store 216 may represent a portion of a deduplicated data system (e.g., a single-instance storage system).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1300 in FIG. 13, or the like. Network 204 may facilitate communication or data transfer using wireless or wired connections. In one embodiment, network 204 may facilitate communication between computing system 202 and server 206.

Figure 3:
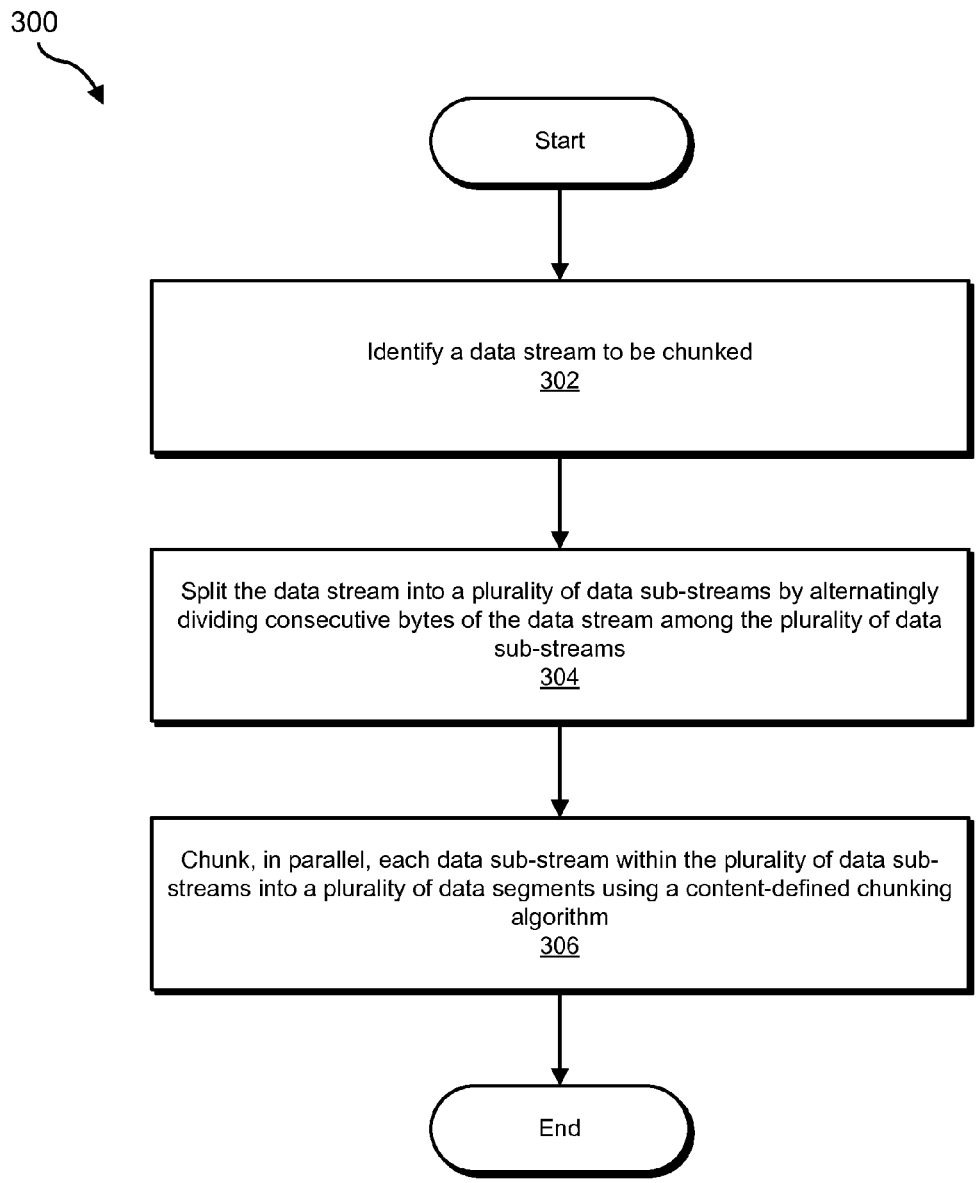
FIG. 3 is a flow diagram of an exemplary method for parallel content-defined data chunking.

FIG. 3 is a flow diagram of an exemplary computer-implemented method 300 for parallel content-defined data chunking. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1210 in FIG. 12, and/or portions of exemplary network architecture 1300 in FIG. 13.

As illustrated in FIG. 3, at step 302 one or more of the systems described herein may identify a data stream to be chunked. For example, at step 302 identification module 104 may, as part of server 206 in FIG. 2, identify data stream 210. As used herein, the term "data stream" may refer to any sequence of digital data. In at least one example, a data stream may represent data that is to be backed up to a deduplicated data system or data that is to be archived to a deduplicated data system. For example, data stream 210 in FIG. 2, data stream 400 in FIG. 4, and/or data stream 700 in FIG. 7 may represent a backup stream containing data 208 that was transmitted from computing system 202 to server 206 to be backed up to deduplicated data store 216.

Figure 4:
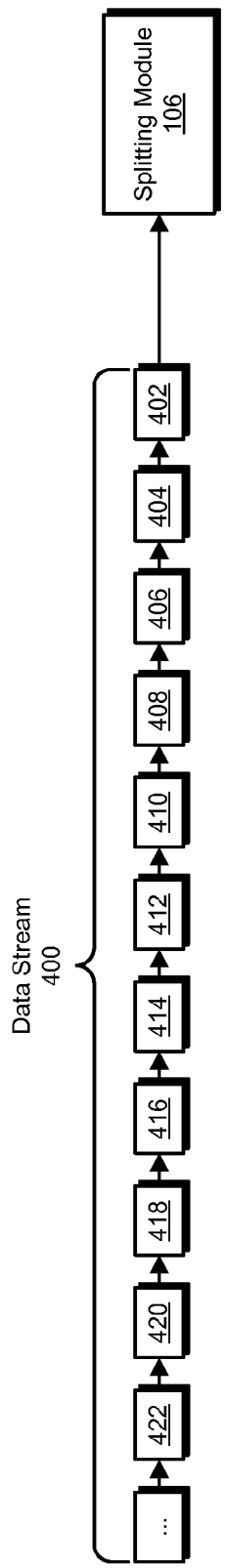
FIG. 4 is a flow diagram of an exemplary data flow for parallel content-defined data chunking.
Figure 7:
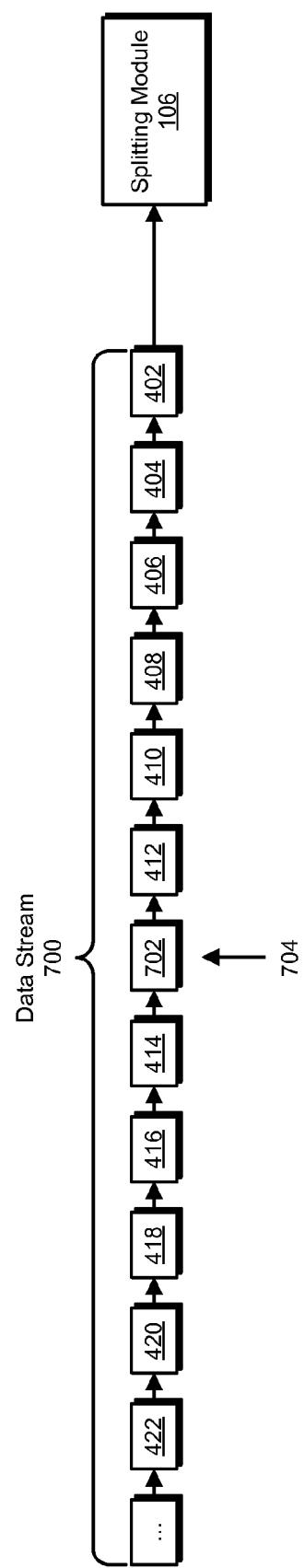
FIG. 7 is a flow diagram of an exemplary data flow for parallel content-defined data chunking.

FIGS. 4 and 7 provide illustrations of two related data streams. As shown in FIG. 4, data stream 400 may include the sequence of bytes 402-422. The sequence of bytes 402-422 in data stream 400 may represent a portion of data 208 in FIG. 2 that is to be backed up to deduplicated data store 216. In one example, bytes 402-422 in data stream 400 may represent a first version of data 208 that is to be backed up to deduplicated data store 216. As shown in FIG. 7, data stream 700 may include the sequence of bytes 402-412, 702, and 414-422. The sequence of bytes 402-412, 702, and 414-422 may represent a second version of data 208 (e.g., a version of data 208 that has had data (e.g., byte 702) inserted at point 704). As will be explained in greater detail below, the systems and methods described herein may reduce the amount of storage space required to back up the first and second versions of data 208 to deduplicated data store 216 by (1) identifying redundant data within data streams 400 and 700 and (2) storing only data that is unique to deduplicated data store 216.

Returning to FIG. 3, the systems described herein may perform step 302 in any suitable manner. In one example, identification module 104 may identify a data stream to be chunked by simply receiving the data stream. For example, identification module 104 may identify data stream 210 by receiving data stream 210 from computing system 202. Using FIGS. 4 and 7 as additional examples, identification module 104 may identify data stream 400 and/or data stream 700 by receiving data stream 400 and/or data stream 700 from computing system 202.

Additionally and/or alternatively, identification module 104 may identify a data stream by creating the data stream. For example, identification module 104 may, as part of computing system 202, create data stream 210 by (1) identifying data 208 that is to be backed up and/or archived to server 206 and (2) transmitting data 208 to server 206 within data stream 210.

At step 304, one or more of the systems described herein may split the data stream into a plurality of data sub-streams by alternatingly dividing consecutive bytes of the data stream among the plurality of data sub-streams. For example, at step 304 splitting module 106 may, as part of server 206 in FIG. 2, split data stream 210 into data sub-streams 212(1)-(N) by alternatingly dividing consecutive bytes of data stream 210 among data sub-streams 212(1)-(N).

The term "byte," as used herein, may refer to any unit of data by which a data stream may be divided and/or any unit of data on which a content-defined chunking algorithm may operate. In one example, a byte may refer to 8 bits of digital data. In other examples, a byte may refer to a unit of data whose size is equal to the window length of a sliding-window based content-defined chunking algorithm. In at least one example, a byte may refer to any unit of data whose size is equal to or smaller than the size of the smallest data segment that may be identified by a content-defined chunking algorithm. The term "consecutive bytes," as used herein, may refer to any two adjacent bytes within a sequence of bytes. Examples of consecutive bytes include bytes 402 and 404 in FIG. 4 and bytes 702 and 414 in FIG. 7.

Returning to FIG. 3, the systems described herein may perform step 304 in any suitable manner. For example, splitting module 106 may alternatingly divide consecutive bytes of a data stream among a plurality of data sub-streams using any method that allows the data stream to be later reconstructed from the plurality of data sub-streams. In one example, splitting module 106 may split the bytes of a data stream among a plurality of data sub-streams using the expression i modulo n, where i is the index of a byte in the data stream, n is the number of data sub-streams among which the data stream is to be divided, and the resulting value is the index of the data sub-stream to which the byte should be appended.

Figure 5:
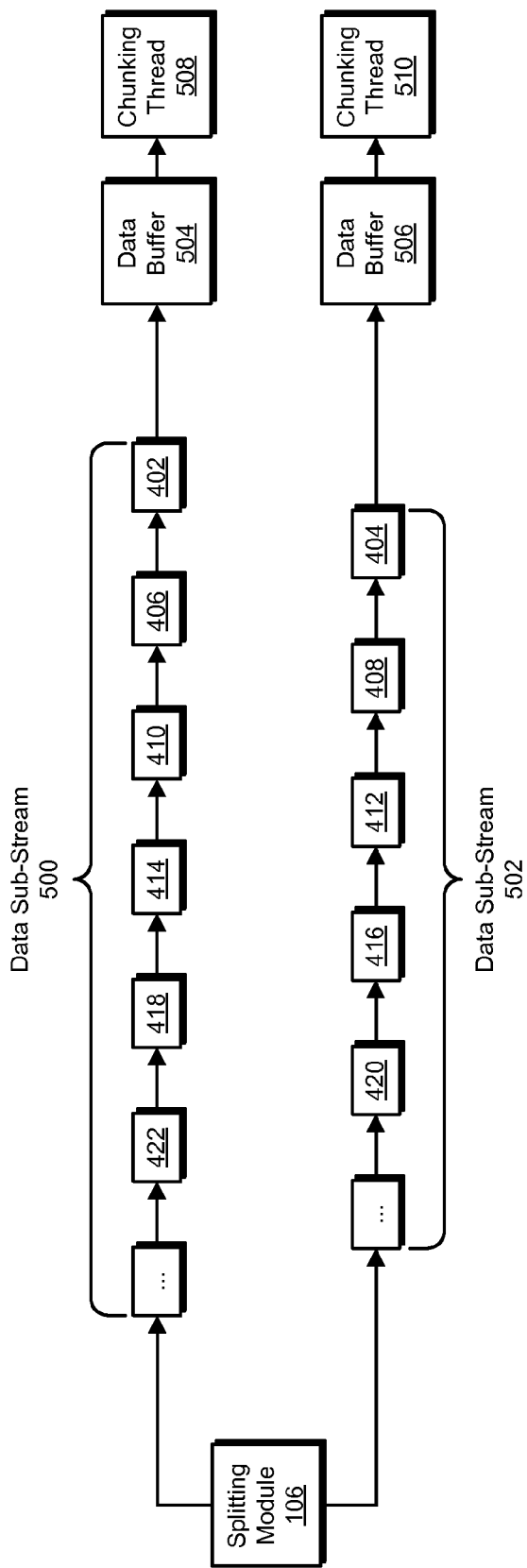
FIG. 5 is a flow diagram of an exemplary data flow for parallel content-defined data chunking.

FIG. 5 illustrates an example of how splitting module 106 may split data stream 400 in FIG. 4 into two data sub-streams 500 and 502 using the expression i modulo 2. In this example, bytes 402-422 in data stream 400 may have indexes 0-10, respectively, and data sub-streams 500 and 502 may have indexes 0 and 1, respectively. Splitting module 106 may split data stream 400 among data sub-streams 500 and 502 by calculating i modulo 2 for each of bytes 402-422 and by allocating each of bytes 402-422 to the correct data sub-stream. For example, splitting module 106 may begin splitting data stream 400 among data sub-streams 500 and 502 by appending byte 402 to data sub-stream 500 after determining that 0 (i.e., the index of byte 402) modulo 2 is equal to 0 (i.e., the index of data sub-stream 500).

Splitting module 106 may continue splitting data stream 400 among data sub-streams 500 and 502 by appending byte 404 to data sub-stream 502 after determining that 1 (i.e., the index of byte 404) modulo 2 is equal to 1 (i.e., the index of data sub-stream 502). After splitting module 106 has divided the remaining bytes of data stream 400 among data sub-streams 500 and 502, data sub-stream 500 may include the sequence of bytes 402, 406, 410, 414, 418, and 422, and data sub-stream 502 may include the sequence of bytes 404, 408, 412, 416, and 420. As mentioned above, bytes 402-422 in data stream 400 may represent a portion of a first version of data 208 in FIG. 2; thus, data sub-streams 500 and 502 may each contain portions of the first version of data 208 as a result of splitting data stream 400 among data sub-streams 500 and 502.

Figure 8:
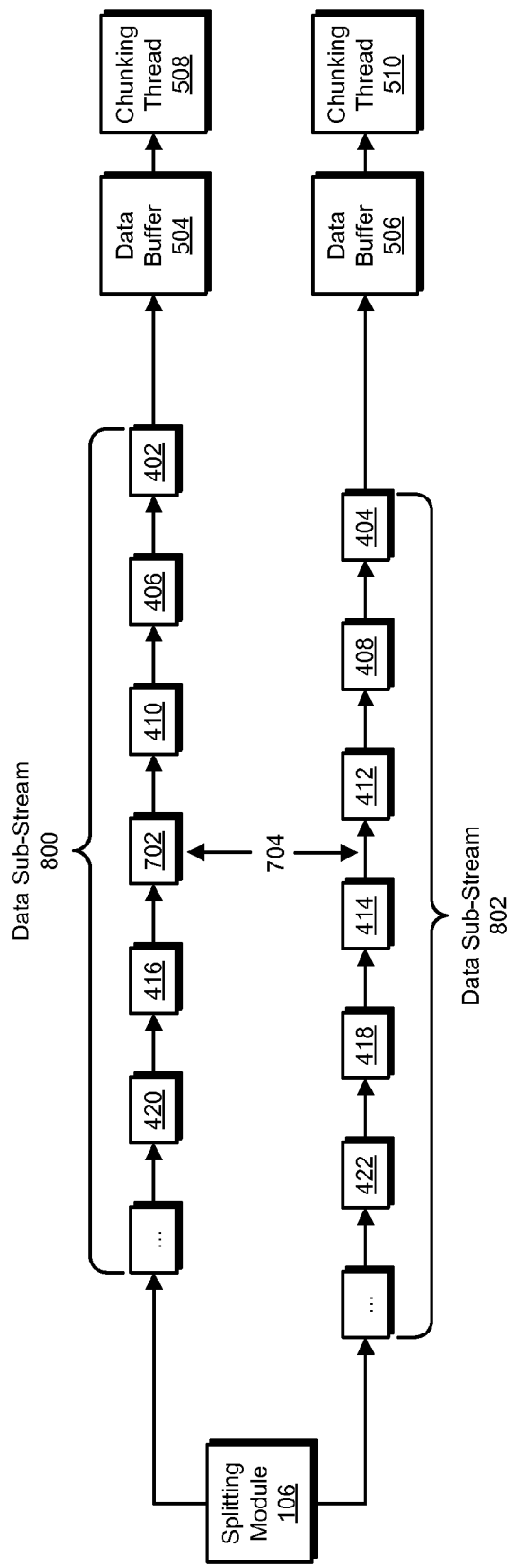
FIG. 8 is a flow diagram of an exemplary data flow for parallel content-defined data chunking.

FIG. 8 illustrates an example of how splitting module 106 may split data stream 700 in FIG. 7 into two data sub-streams 800 and 802 using the expression i modulo 2. In this example, bytes 402-412, 702, and 414-422 in data stream 700 may have indexes 0-11, respectively, and data sub-streams 800 and 802 may have indexes 0 and 1, respectively. Splitting module 106 may split data stream 700 among data sub-streams 800 and 802 by calculating i modulo 2 for each of bytes 402-412, 702, and 414-422 and by allocating each of bytes 402-412, 702, and 414-422 to the correct data sub-stream. After splitting module 106 has divided the bytes of data stream 700 among data sub-streams 800 and 802, data sub-stream 800 may include the sequence of bytes 402, 406, 410, 702, 416, and 420; and data sub-stream 802 may include the sequence of bytes 404, 408, 412, 414, 418, and 422. As mentioned above, bytes 402-412, 702, and 414-422 in data stream 700 may represent a portion of second version of data 208 in FIG. 2; thus, data sub-streams 800 and 802 may each contain portions of the second version of data 208 as a result of splitting data stream 700 among data sub-streams 800 and 802.

FIG. 8 also illustrates how insertion of one or more bytes into a data stream may have little effect on how the bytes of the data stream are divided among the data stream's data sub-streams. As can be seen in FIGS. 7 and 8, insertion of byte 702 into data stream 700 at point 704 may not affect the sequences of bytes in data sub-streams 800 and 802 before and after point 704 as compared to the same sequences of bytes in data sub-streams 500 and 502 in FIG. 5.

Returning to FIG. 3 in some examples, each data sub-stream within a plurality of data sub-streams may be chunked by a separate thread of execution. For this reason, splitting module 106 may split a data stream based on the number of threads available to perform chucking calculations on data sub-streams. For example, splitting module 106 may split a data stream into n data sub-streams for n chunking threads. Using FIG. 5 as an example, splitting module 106 may split data stream 400 into two data sub-streams (e.g., data sub-streams 500 and 502) after determining that two chunking threads (e.g., chunking threads 508 and 510) are available to perform chunking calculations.

In some examples, splitting module 106 may split a data stream into a plurality of data sub-streams by alternatingly dividing consecutive bytes of the data stream among a plurality of data buffers (e.g., data buffers used by chunking threads). Using FIG. 5 as an example, splitting module 106 may split data stream 400 among data buffers 504 and 506.

At step 306, one or more of the systems described herein may chunk, in parallel, each data sub-stream within the plurality of data sub-streams into a plurality of data segments using a content-defined chunking algorithm. For example, at step 306 chunking module 108 may, as part of server 206 in FIG. 2, chunk, in parallel, each data sub-stream within data sub-streams 212(1)-(N) into data segments 214 using a content-defined chunking algorithm. Upon completion of step 306, exemplary method 300 in FIG. 3 may terminate.

The systems described herein may perform step 306 using any suitable content-defined chunking algorithm. As used herein, the term "content-defined chunking algorithm" may refer to any algorithm or heuristic capable of dividing a data sub-stream into one or more data segments based on the content of the data sub-stream. In at least one example, the term "content-defined chunking algorithm" may refer to a sliding window algorithm, such as the Rabin fingerprinting algorithm. The term "data segment," as used herein, may refer to a segment of data, a block of data, or any other suitable unit of data used for identifying unique and redundant data within data streams and/or data sub-streams.

In some examples, chunking module 108 may chunk a data sub-stream into a plurality of data segments using a sliding window algorithm with a sliding window of length n by calculating a signature for every sequence of n bytes within the data sub-stream. Chunking module 108 may determine that a sequence of bytes within the data sub-stream identifies a segment marker (e.g., a data segment's boundary) when the signature of the sequence of bytes matches a predefined value. By identifying every segment marker within a data sub-stream, chunking module 108 may identify every data segment within the data sub-stream. Using FIGS. 6 and 9 as examples, chunking module 108 may chunk data sub-streams 500 and 502 into data segments 600-620 by identifying each segment marker within data sub-streams 500 and 502 and/or data sub-streams 800 and 802 into data segments 602, 604, 608-614, 618, 620, 902, and 904 by identifying each segment marker within data sub-streams 800 and 802.

In some examples, chunking module 108 may chunk each data sub-stream within a plurality of data sub-streams via a separate thread of execution. Using FIG. 5 as an example, chunking module 108 may concurrently chunk data sub-streams 500 and 502 via chunking threads 508 and 510.

In some examples, chunking module 108 may begin chunking a data sub-stream as soon as one segment marker can be identified within the data sub-stream. For example, if chunking module 108 is configured to use a sliding window algorithm with a sliding window of length n (e.g., as described above), chunking module 108 may begin chunking a data sub-stream as soon as the data sub-stream contains n bytes. Using FIG. 5 as an example, chunking module 108 may begin chunking data sub-streams 500 and/or 502 via chunking threads 508 and 510 as soon as data buffers 504 and/or 506 contain enough bytes to identify a single segment marker.

Because chunking module 108 may begin chunking a data sub-stream as soon as one segment marker can be identified within the data sub-stream, the size of the data buffers that are used by chunking module 108 to store data sub-streams may be required to be only large enough to hold the largest data segments that may be identified by chunking module 108.

Figure 10:
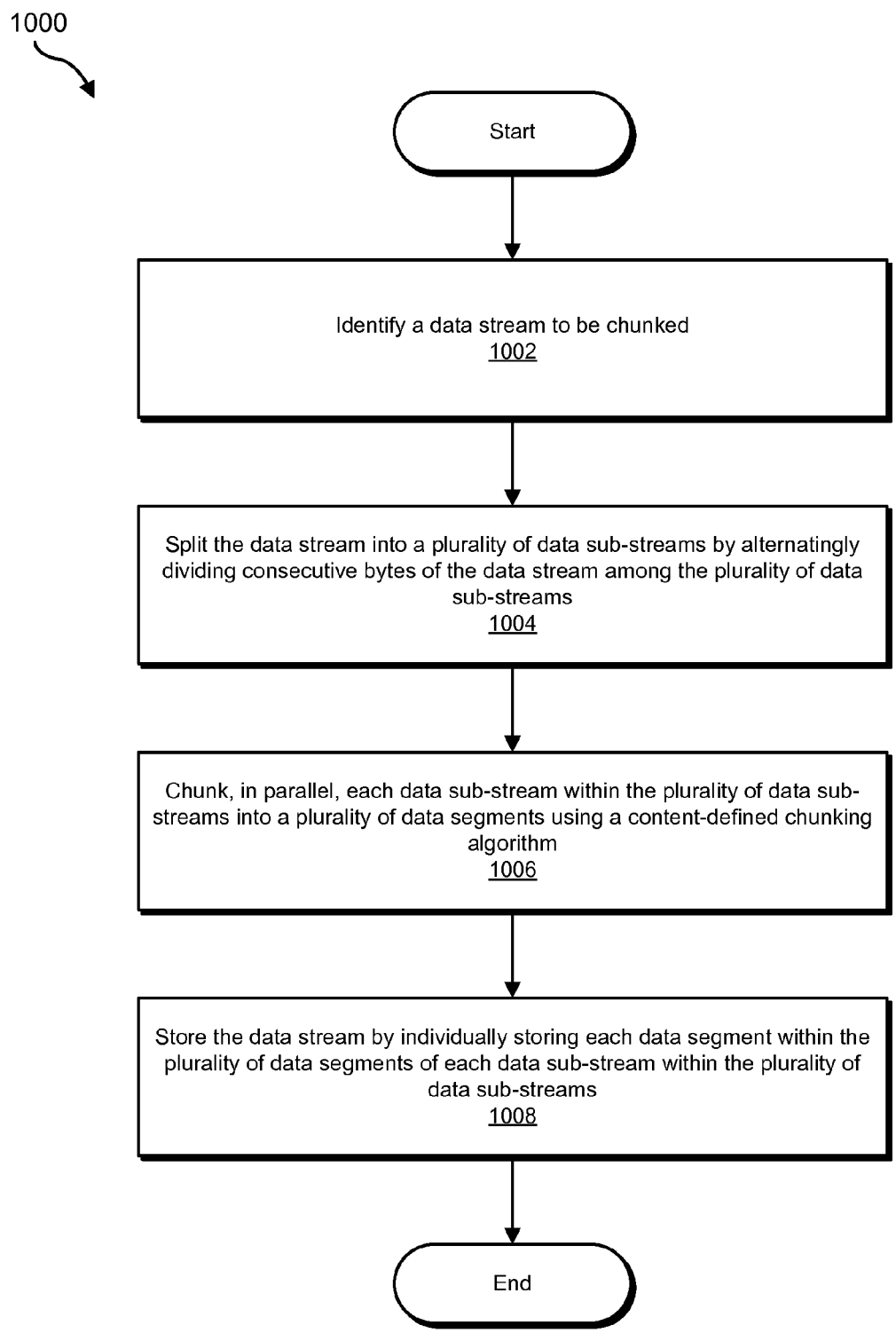
FIG. 10 is a flow diagram of an exemplary method for parallel content-defined data chunking.

As mentioned above, one reason for chunking a data stream's data sub-streams into multiple data segments may be to identify redundant data within the data stream so that only unique data is transmitted to and/or stored within a deduplicated data system. FIG. 10 illustrates how the data segments of a data stream's data sub-streams may be used to store the data stream in a deduplicated data system. FIG. 10 is a flow diagram of an exemplary computer-implemented method 1000 for parallel content-defined data chunking. The steps shown in FIG. 10 may be performed by any suitable computer-executable code and/or computing system. In some embodiments, the steps shown in FIG. 10 may be performed by one or more of the components of system 100 in FIG. 1, system 200 in FIG. 2, computing system 1210 in FIG. 12, and/or portions of exemplary network architecture 1300 in FIG. 13. Steps 1002-1006 in FIG. 10 are similar to steps 302-306 in FIG. 3. Therefore, the discussion of steps 302-306 in FIG. 3 may apply to steps 1002-1006 in FIG. 10.

At step 1008, one or more of the systems described herein may store the data stream by individually storing each data segment within the plurality of data segments of each data sub-stream within the plurality of data sub-streams. For example, at step 1008 storage module 110 may, as part of server 206 in FIG. 2, store data stream 210 to deduplicated data store 216 by individually storing data segments 214 to deduplicated data store 216. Upon completion of step 1008, exemplary method 1000 in FIG. 10 may terminate.

The systems described herein may perform step 1008 in any suitable manner. For example, storage module 110 may store a data stream to deduplicated data store 216 by storing the data segments of its data sub-streams to deduplicated data store 216 and by associating the data segments with the data stream and/or its data sub-streams. For example, storage module 110 may store, for each data stream stored to deduplicated data store 216, a list of references to data segments that make up the data stream and/or its data sub-streams. Storage module 110 may later use this list of references to identify data segments within deduplicated data store 216 that may be used to reconstruct the data stream and/or its data sub-streams.

Figure 6:
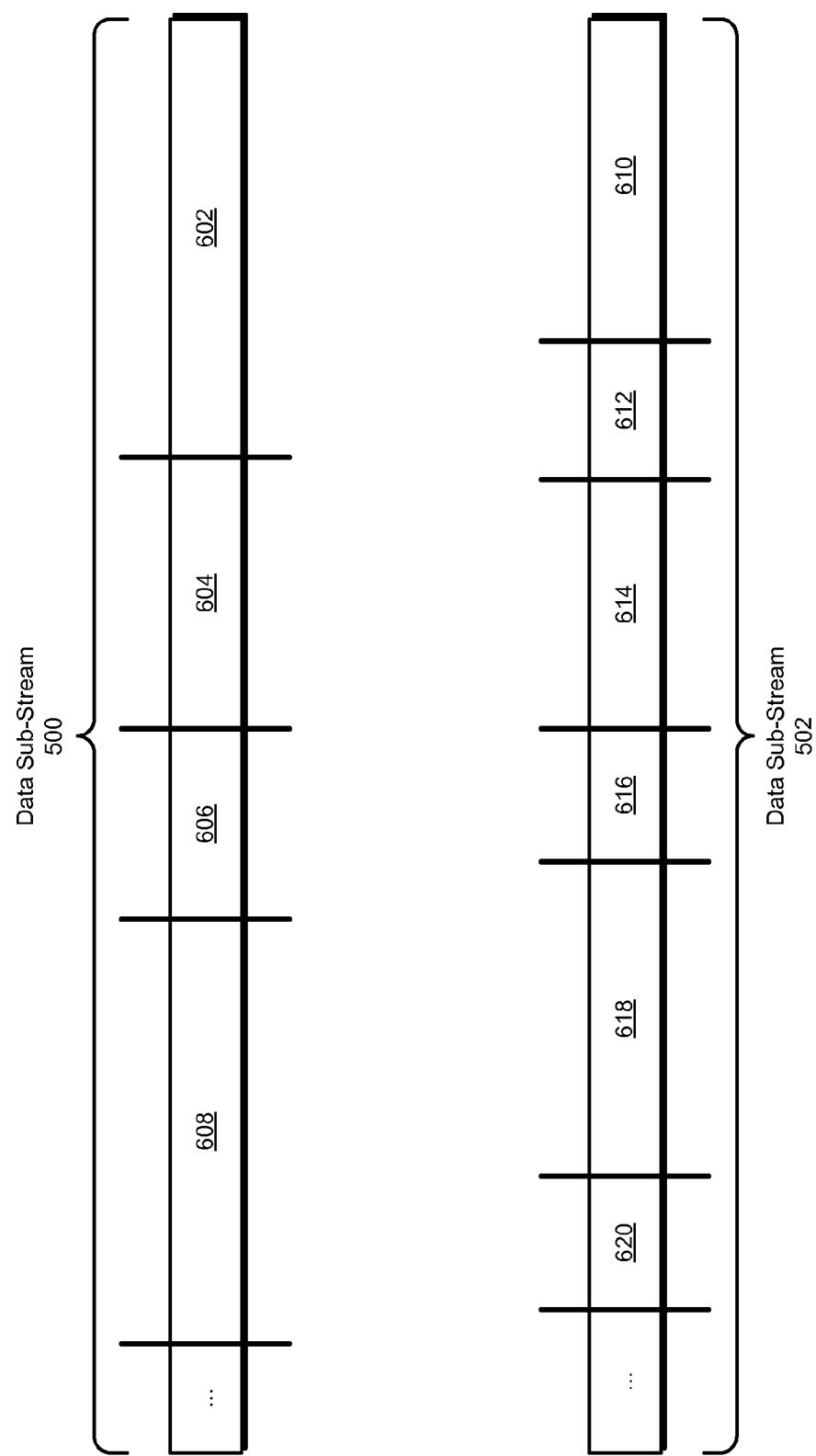
FIG. 6 is a block diagram of exemplary chunked data sub-streams.
Figure 9:
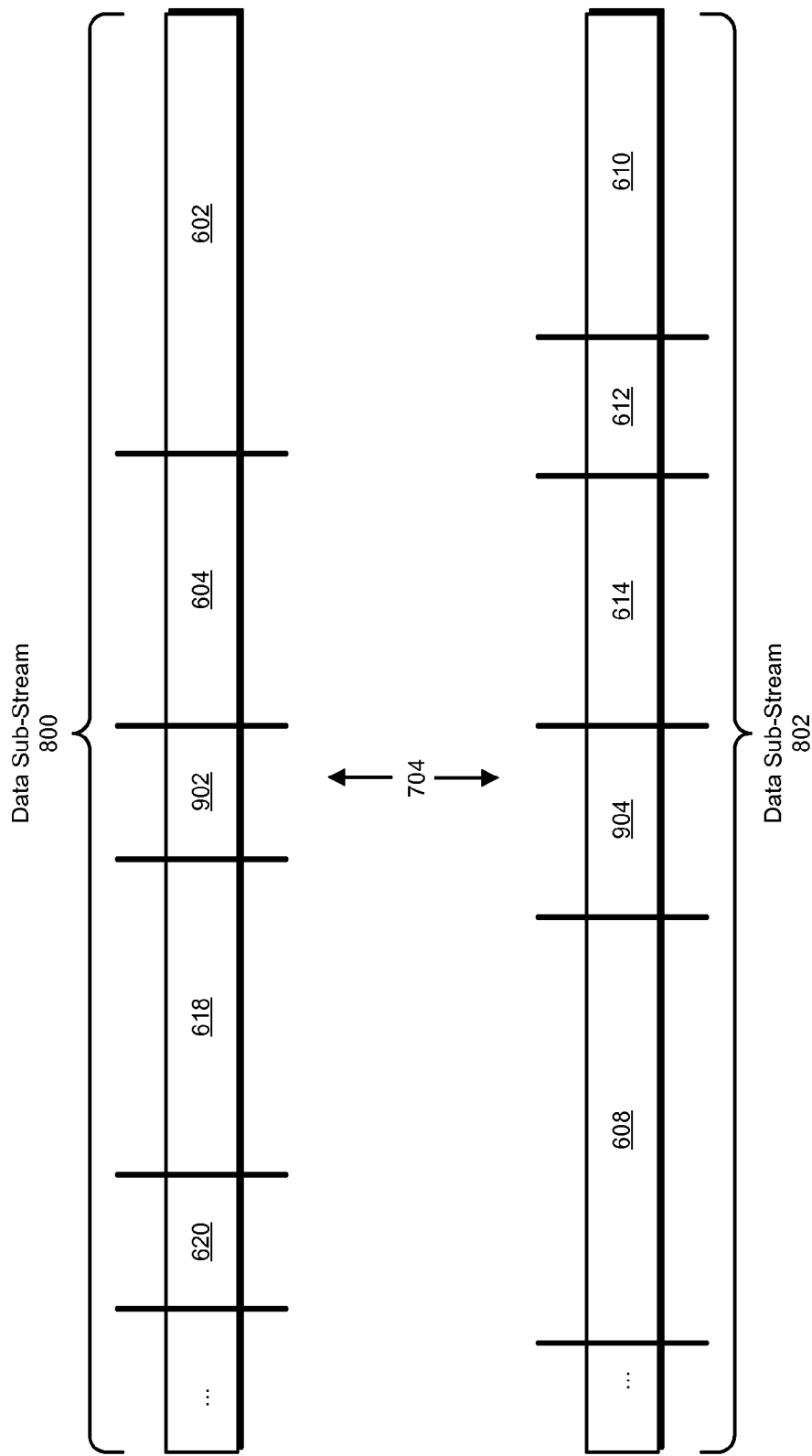
FIG. 9 is a block diagram of exemplary chunked data sub-streams.

Using FIGS. 6 and 9 as examples, storage module 110 may store data stream 400 in FIG. 4 to deduplicated data store 216 by storing data segments 600-620 to deduplicated data store 216 and by associating data segments 600-620 with data stream 400. Similarly, storage module 110 may store data stream 700 in FIG. 7 to deduplicated data store 216 by storing data segments 602, 604, 608-614, 618, 620, 902, and 904 to deduplicated data store 216 and by associating data segments 602, 604, 608-614, 618, 620, 902, and 904 with data stream 700.

In some examples, storage module 110 may reduce the amount of storage needed to store a data stream by identifying redundant data segments of the data stream's data sub-streams and storing only those data segments that are unique. Using FIGS. 6 and 9 as an example, as mentioned above data stream 400 and data stream 700 may contain two versions of data 208 (e.g., data stream 400 containing a first version of data 208 and data stream 700 containing a second version of data 208). In this example, storage module 110 may store data stream 400 in FIG. 4 to deduplicated data store 216 by individually storing each of data segments 600-620 to deduplicated data store 216 as a result of data segments 600-620 being unique. On the other hand, storage module 110 may store data stream 700 in FIG. 7 to deduplicated data store 216 by only storing data segments 902 and 904 to deduplicated data store 216 as a result of data segments 600-620 having been previously stored to deduplicated data store 216.

Because storage module 110 stores data segments of a data stream's data sub-streams to deduplicated data store 216 instead of data segments of the data stream itself, deduplicated data store 216 may contain the data stream's data but out of sequence. For this reason in addition to storing data segments of a data stream's data sub-streams, storage module 110 may also store information that may be used to reconstruct the data stream from the data segments of its data sub-streams. Examples of information that may be used to reconstruct a data stream from the data segments of its data sub-streams may include the number of data sub-streams among which the data stream was divided and/or the method by which the data stream was divided among the data sub-streams.

Figure 11:
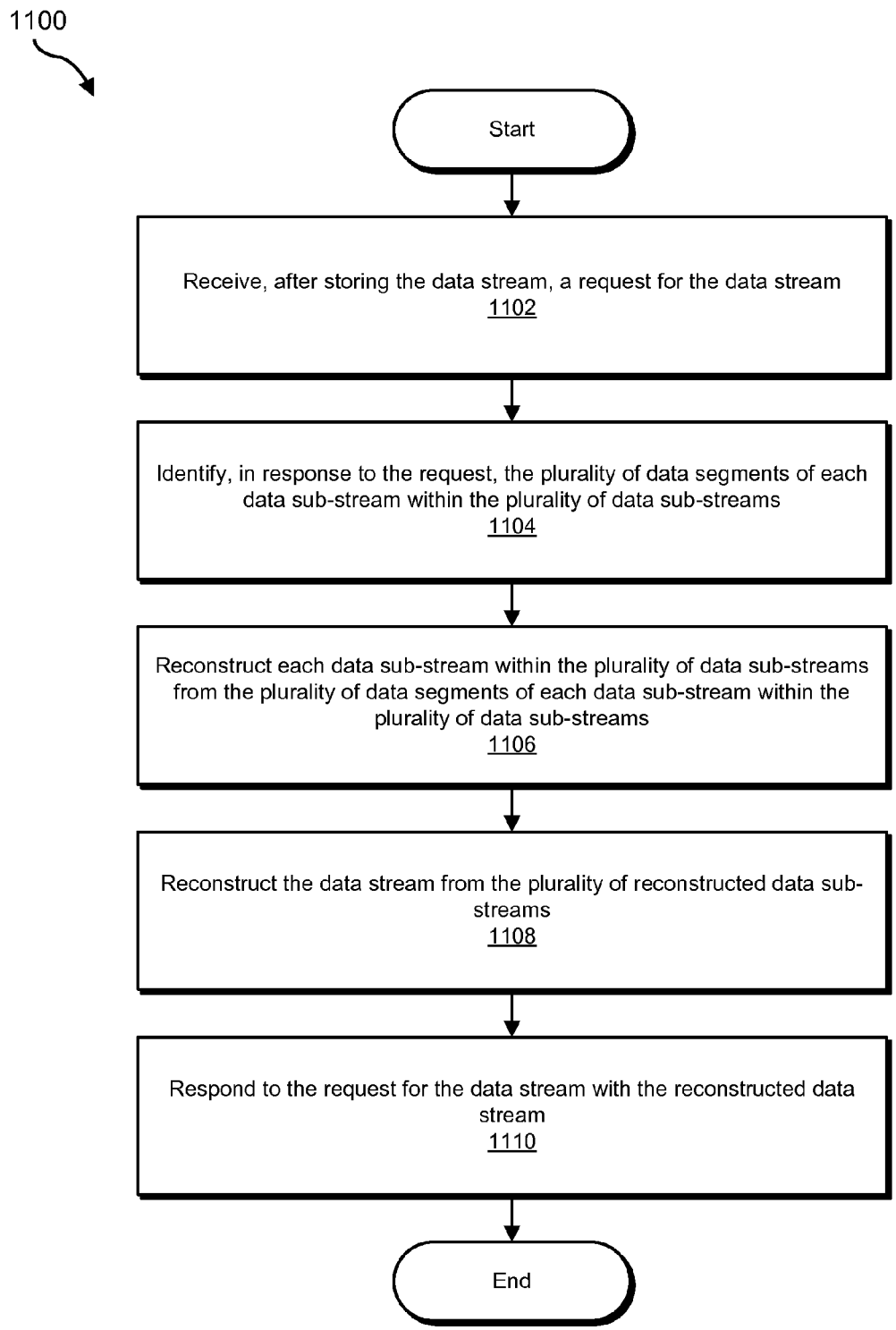
FIG. 11 is a flow diagram of an exemplary method for reconstructing data streams from data segments.

FIG. 11 is a flow diagram of an exemplary computer-implemented method 1100 for reconstructing data streams from data segments. The steps shown in FIG. 11 may be performed by any suitable computer-executable code and/or computing system. In some embodiments, the steps shown in FIG. 11 may be performed by one or more of the components of system 100 in FIG. 1, system 200 in FIG. 2, computing system 1210 in FIG. 12, and/or portions of exemplary network architecture 1300 in FIG. 13.

At step 1102, one or more of the systems described herein may receive, after storing the data stream, a request for the data stream. For example, at step 1102 storage module 110 may, as part of server 206 in FIG. 2, receive a request for data stream 210 after data segments 214 have been stored to deduplicated data store 216. Using FIGS. 4-9 as additional examples, storage module 110 may receive a request for data streams 400 and/or 700 after data segments 600-620, 902, and 904 have been stored to deduplicated data store 216.

At step 1104, one or more of the systems described herein may identify, in response to the request, the plurality of data segments of each data sub-stream within the plurality of data sub-streams. For example, at step 1104 storage module 110 may, as part of server 206 in FIG. 2, identify data segments 214 in response to a request for data stream 210. Using FIGS. 4-6 as another example, storage module 110 may, in response to a request for data stream 400, identify data segments 602-620. Using FIGS. 7-9 as another example, storage module 110 may, in response to a request for data stream 700, identify data segments 602, 604, 608-614, 618, 620, 902, and 904.

The systems described herein may perform step 1104 in any suitable manner. As mentioned above, storage module 110 may have stored a data stream to deduplicated data store 216 by storing the data segments of its data sub-streams to deduplicated data store 216 and by associating the data segments with the data stream and/or its data sub-streams. For example, storage module 110 may have stored a list of references to data segments that make up the data stream and/or its data sub-streams. In at least one example, storage module 110 may use this list of references to identify data segments within deduplicated data store 216 that may be used to reconstruct the data stream and/or its data sub-streams.

At step 1106, one or more of the systems described herein may reconstruct each data sub-stream within the plurality of data sub-streams from the plurality of data segments of each data sub-stream within the plurality of data sub-streams. For example, at step 1106 storage module 110 may, as part of server 206 in FIG. 2, reconstruct data sub-streams 212(1)-(N) from data segments 214. Using FIGS. 4-6 as another example, storage module 110 may reconstruct data sub-streams 500 and 502 from data segments 602-620. Using FIGS. 7-9 as another example, storage module 110 may reconstruct data sub-streams 800 and 802 from data segments 602, 604, 608-614, 618, 620, 902, and 904. The systems described herein may perform step 1106 in any suitable manner. In at least one example, storage module 110 may reconstruct each data sub-streams of a data stream by simply concatenating the data segments associated with the data sub-stream.

At step 1108, one or more of the systems described herein may reconstruct the data stream from the plurality of reconstructed data sub-streams. For example, at step 1108 storage module 110 may, as part of server 206 in FIG. 2, reconstruct data stream 210 from data sub-streams 212(1)-(N). Using FIGS. 4, 5, 7 and 8 as additional examples, storage module 110 may reconstruct data stream 400 from data sub-streams 500 and 502 and reconstruct data stream 700 from data sub-streams 800 and 802.

The systems described herein may perform step 1108 in any suitable manner. As mentioned above in addition to storing data segments of a data stream's data sub-streams, storage module 110 may also store information (e.g., the number of data sub-streams among which the data stream was divided and/or the method by which the data stream was divided among the data sub-streams) that may be used to reconstruct the data stream from its data sub-streams and/or from the data segments of its data sub-streams. In at least one example, storage module 110 may use this information to reconstruct the data from its data sub-streams. In other examples, storage module 110 may reconstruct a data stream without reconstructing any of its data sub-streams by using knowledge of how the data sub-streams would be reconstructed to reconstruct a data stream directly from the data segments of the data stream's data sub-streams.

At step 1110, one or more of the systems described herein may respond to the request for the data stream with the reconstructed data stream. For example, at step 1110 storage module 110 may, as part of server 206 in FIG. 2, respond to the request for data stream 210 with the data stream 210. Upon completion of step 1110, exemplary method 1100 in FIG. 11 may terminate.

As explained above, by (1) alternatingly dividing consecutive bytes of data streams among multiple data sub-streams and (2) chunking the data sub-streams instead of the data streams, the systems and methods described herein may perform parallel content-defined data chunking without consuming large amounts of memory and without sacrificing concurrency. For example, one potential result of alternatingly dividing consecutive bytes of a data stream among multiple data sub-streams is that a data sub-stream may be chunked as soon as the data sub-stream contains enough data to perform a single chunking calculation, which may reduce the need for large memory buffers. Another potential result of alternatingly dividing consecutive bytes of a data stream among multiple data sub-streams is that each data sub-stream may be completely chunked without reliance on data from other data-sub-streams, which may ensure high levels of concurrency when chunking in parallel.

Figure 12:
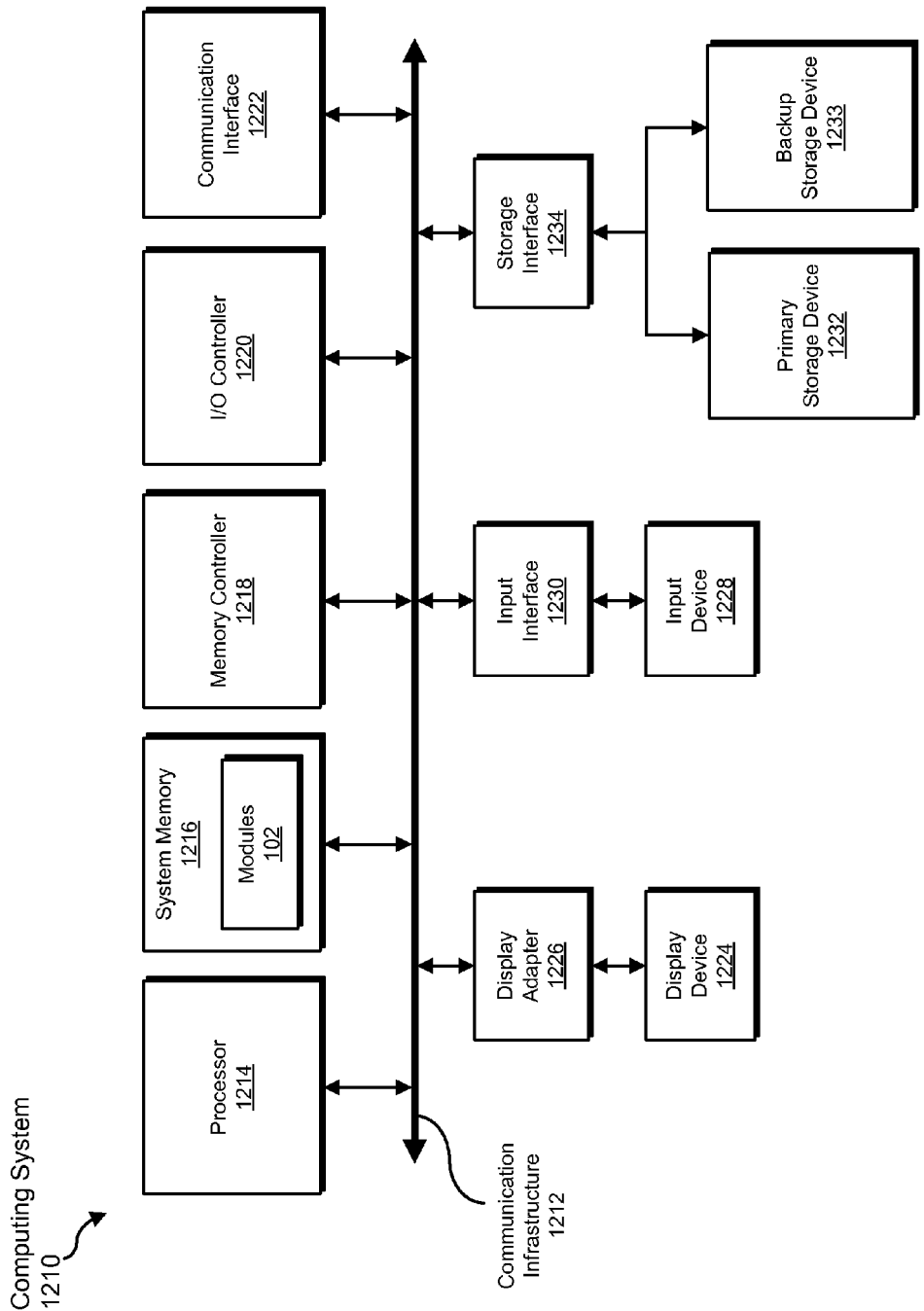
FIG. 12 is a block diagram of an exemplary computing system capable of implementing one or more of the embodiments described and/or illustrated herein.

FIG. 12 is a block diagram of an exemplary computing system 1210 capable of implementing one or more of the embodiments described and/or illustrated herein. For example, all or a portion of computing system 1210 may perform and/or be a means for performing, either alone or in combination with other elements, one or more of the steps described herein (such as one or more of the steps illustrated in FIG. 3). All or a portion of computing system 1210 may also perform and/or be a means for performing any other steps, methods, or processes described and/or illustrated herein.

Computing system 1210 broadly represents any single or multi-processor computing device or system capable of executing computer-readable instructions. Examples of computing system 1210 include, without limitation, workstations, laptops, client-side terminals, servers, distributed computing systems, handheld devices, or any other computing system or device. In its most basic configuration, computing system 1210 may include at least one processor 1214 and a system memory 1216.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the exemplary embodiments described and/or illustrated herein.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described in detail below). In one example, one or more of modules 102 from FIG. 1 may be loaded into system memory 1216.

In certain embodiments, exemplary computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI Express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1212.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between exemplary computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also allow computing system 1210 to engage in distributed or remote computing. For example, communication interface 1222 may receive instructions from a remote device or send instructions to a remote device for execution.

As illustrated in FIG. 12, computing system 1210 may also include at least one display device 1224 coupled to communication infrastructure 1212 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1212 (or from a frame buffer, as known in the art) for display on display device 1224.

As illustrated in FIG. 12, exemplary computing system 1210 may also include at least one input device 1228 coupled to communication infrastructure 1212 via an input interface 1230. Input device 1228 generally represents any type or form of input device capable of providing input, either computer or human generated, to exemplary computing system 1210. Examples of input device 1228 include, without limitation, a keyboard, a pointing device, a speech recognition device, or any other input device.

As illustrated in FIG. 12, exemplary computing system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a solid state drive, a floppy disk drive, a magnetic tape drive, an optical disk drive, a flash drive, or the like. Storage interface 1234 generally represents any type or form of interface or device for transferring data between storage devices 1232 and 1233 and other components of computing system 1210.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12. Computing system 1210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1210. All or a portion of the computer program stored on the computer-readable-storage medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1210 may be configured as an Application Specific Integrated Circuit (ASIC) adapted to implement one or more of the exemplary embodiments disclosed herein.

Figure 13:
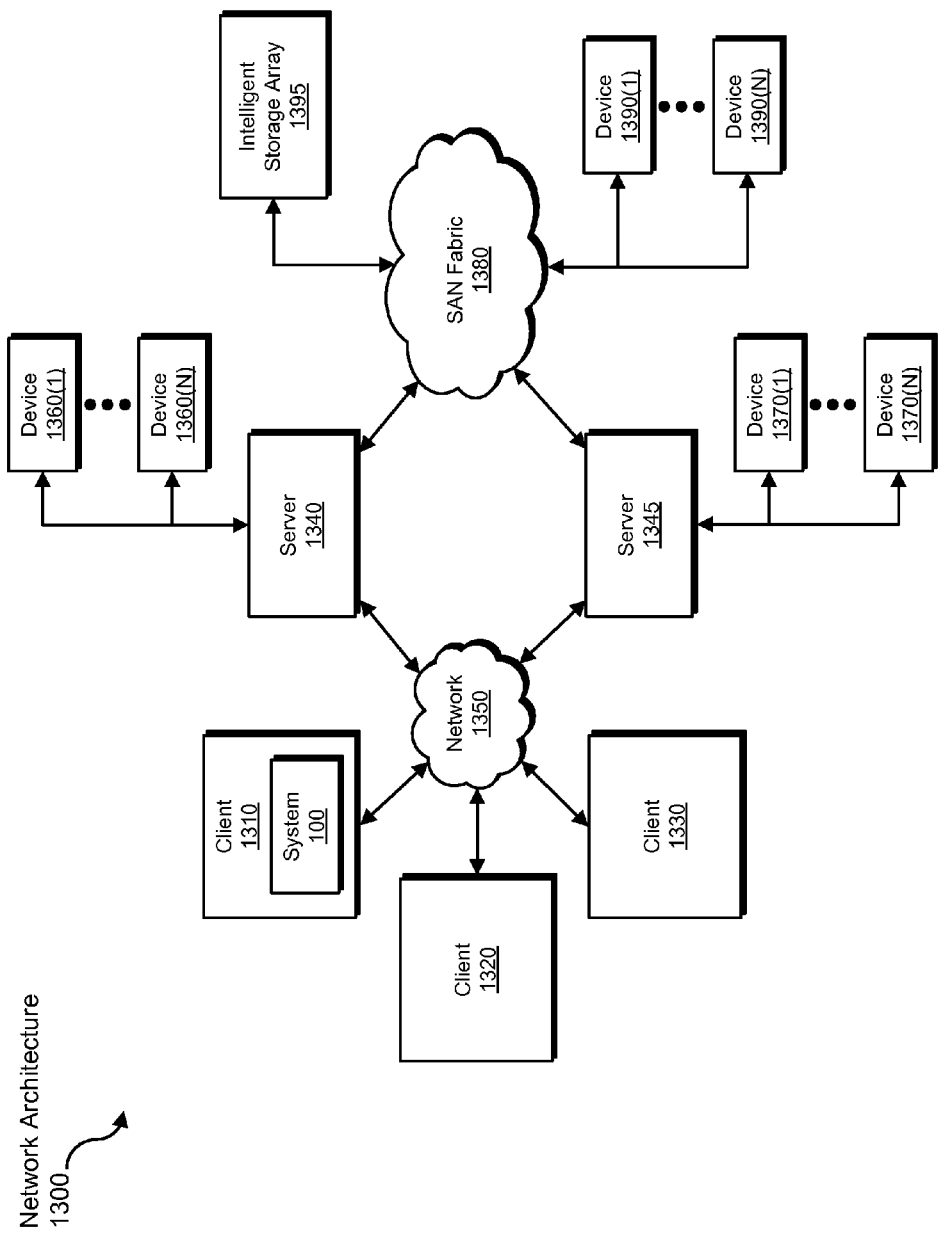
FIG. 13 is a block diagram of an exemplary computing network capable of implementing one or more of the embodiments described and/or illustrated herein.

FIG. 13 is a block diagram of an exemplary network architecture 1300 in which client systems 1310, 1320, and 1330 and servers 1340 and 1345 may be coupled to a network 1350. As detailed above, all or a portion of network architecture 1300 may perform and/or be a means for performing, either alone or in combination with other elements, one or more of the steps disclosed herein (such as one or more of the steps illustrated in FIG. 3). All or a portion of network architecture 1300 may also be used to perform and/or be a means for performing other steps and features set forth in the instant disclosure.

Client systems 1310, 1320, and 1330 generally represent any type or form of computing device or system, such as exemplary computing system 1210 in FIG. 12. Similarly, servers 1340 and 1345 generally represent computing devices or systems, such as application servers or database servers, configured to provide various database services and/or run certain software applications. Network 1350 generally represents any telecommunication or computer network including, for example, an intranet, a WAN, a LAN, a PAN, or the Internet. In one example, client systems 1310, 1320, and/or 1330 and/or servers 1340 and/or 1345 may include all or a portion of system 100 from FIG. 1.

As illustrated in FIG. 13, one or more storage devices 1360(1)-(N) may be directly attached to server 1340. Similarly, one or more storage devices 1370(1)-(N) may be directly attached to server 1345. Storage devices 1360(1)-(N) and storage devices 1370(1)-(N) generally represent any type or form of storage device or medium capable of storing data and/or other computer-readable instructions. In certain embodiments, storage devices 1360(1)-(N) and storage devices 1370(1)-(N) may represent Network-Attached Storage (NAS) devices configured to communicate with servers 1340 and 1345 using various protocols, such as Network File System (NFS), Server Message Block (SMB), or Common Internet File System (CIFS).

Servers 1340 and 1345 may also be connected to a Storage Area Network (SAN) fabric 1380. SAN fabric 1380 generally represents any type or form of computer network or architecture capable of facilitating communication between a plurality of storage devices. SAN fabric 1380 may facilitate communication between servers 1340 and 1345 and a plurality of storage devices 1390(1)-(N) and/or an intelligent storage array 1395. SAN fabric 1380 may also facilitate, via network 1350 and servers 1340 and 1345, communication between client systems 1310, 1320, and 1330 and storage devices 1390(1)-(N) and/or intelligent storage array 1395 in such a manner that devices 1390(1)-(N) and array 1395 appear as locally attached devices to client systems 1310, 1320, and 1330. As with storage devices 1360(1)-(N) and storage devices 1370(1)-(N), storage devices 1390(1)-(N) and intelligent storage array 1395 generally represent any type or form of storage device or medium capable of storing data and/or other computer-readable instructions.

In certain embodiments, and with reference to exemplary computing system 1210 of FIG. 12, a communication interface, such as communication interface 1222 in FIG. 12, may be used to provide connectivity between each client system 1310, 1320, and 1330 and network 1350. Client systems 1310, 1320, and 1330 may be able to access information on server 1340 or 1345 using, for example, a web browser or other client software. Such software may allow client systems 1310, 1320, and 1330 to access data hosted by server 1340, server 1345, storage devices 1360(1)-(N), storage devices 1370(1)-(N), storage devices 1390(1)-(N), or intelligent storage array 1395. Although FIG. 13 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1340, server 1345, storage devices 1360(1)-(N), storage devices 1370(1)-(N), storage devices 1390(1)-(N), intelligent storage array 1395, or any combination thereof. All or a portion of one or more of the exemplary embodiments disclosed herein may also be encoded as a computer program, stored in server 1340, run by server 1345, and distributed to client systems 1310, 1320, and 1330 over network 1350.

As detailed above, computing system 1210 and/or one or more components of network architecture 1300 may perform and/or be a means for performing, either alone or in combination with other elements, one or more steps of an exemplary method for parallel content-defined data chunking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data stream (e.g., one or more files) to be transformed, transform the data streams into multiple data sub-streams and then into multiple data segments, output a result of the transformation to a deduplicated data system, use the result of the transformation to deduplicate the data stream, and store the result of the transformation to a deduplicated data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for parallel content-defined data chunking, at least a portion of the method being performed by a computing device comprising at least one processor, the method comprising:
    identifying a data stream to be chunked;
    creating, from the data stream, a plurality of data sub-streams by alternatingly dividing bytes of the data stream among the plurality of data sub-streams such that:
        each of the plurality of data sub-streams comprises two or more of the bytes of the data stream;
        consecutive bytes within the data stream are contained in different data sub-streams within the plurality of data sub-streams;
    chunking, in parallel, each data sub-stream within the plurality of data sub-streams into a plurality of data segments using a content-defined chunking algorithm.

2. The computer-implemented method of claim 1, further comprising storing the data stream by individually storing each data segment within the plurality of data segments of each data sub-stream within the plurality of data sub-streams.

3. The computer-implemented method of claim 2, further comprising:
    receiving, after storing the data stream, a request for the data stream;

identifying, in response to the request, the plurality of data segments of each data sub-stream within the plurality of data sub-streams;
reconstructing each data sub-stream within the plurality of data sub-streams from the plurality of data segments of each data sub-stream within the plurality of data sub-streams;
reconstructing the data stream from the plurality of reconstructed data sub-streams;
responding to the request for the data stream with the reconstructed data stream.

4. The computer-implemented method of claim 2, wherein storing the data stream by individually storing each data segment within the plurality of data segments of each data sub-stream within the plurality of data sub-streams comprises storing only unique data segments within the plurality of data segments of each data sub-stream within the plurality of data sub-streams.

5. The computer-implemented method of claim 1, wherein creating the plurality of data sub-streams comprises alternatingly dividing the bytes of the data stream among a plurality of data buffers, wherein each data buffer within the plurality of data buffers has a size equal to the maximum size of data segments identified by the content-defined chunking algorithm.

6. The computer-implemented method of claim 1, wherein chunking each data sub-stream within the plurality of data sub-streams comprises beginning to chunk at least one data sub-stream within the plurality of data sub-streams when one segment marker could be identified within the data sub-stream.

7. The computer-implemented method of claim 1, wherein each data sub-stream within the plurality of data sub-streams is chunked by a separate thread of execution.

8. The computer-implemented method of claim 1, wherein:
the data stream comprises at least one file that is to be deduplicated;
the file comprises the consecutive bytes.

9. A system for parallel content-defined data chunking, the system comprising:
an identifying module that identifies a data stream to be chunked;
a splitting module that creates, from the data stream, a plurality of data sub-streams by alternatingly dividing bytes of the data stream among the plurality of data sub-streams such that:
each of the plurality of data sub-streams comprises two or more of the bytes of the data stream;
consecutive bytes within the data stream are contained in different data sub-streams within the plurality of data sub-streams;
a chunking module that chunks, in parallel, each data sub-stream within the plurality of data sub-streams into a plurality of data segments using a content-defined chunking algorithm;
at least one processor configured to execute the identifying module, the splitting module, and the chunking module.

10. The system of claim 9, further comprising a storing module that stores the data stream by individually storing each data segment within the plurality of data segments of each data sub-stream within the plurality of data sub-streams.

11. The system claim 10, wherein the storing module further:

receives, after storing the data stream, a request for the data stream;
identifies, in response to the request, the plurality of data segments of each data sub-stream within the plurality of data sub-streams;
reconstructs each data sub-stream within the plurality of data sub-streams from the plurality of data segments of each data sub-stream within the plurality of data sub-streams;
reconstructs the data stream from the plurality of reconstructed data sub-streams;
responds to the request for the data stream with the reconstructed data stream.

12. The system of claim 10, wherein the storing module stores the data stream by individually storing each data segment within the plurality of data segments of each data sub-stream within the plurality of data sub-streams by storing only unique data segments within the plurality of data segments of each data sub-stream within the plurality of data sub-streams.

13. The system of claim 9, wherein the splitting module creates the plurality of data sub-streams by alternatingly dividing the bytes of the data stream among a plurality of data buffers, wherein each data buffer within the plurality of data buffers has a size equal to the maximum size of data segments identified by the content-defined chunking algorithm.

14. The system of claim 9, wherein the chunking module chunks each data sub-stream within the plurality of data sub-streams by beginning to chunk at least one data sub-stream within the plurality of data sub-streams when one segment marker could be identified within the data sub-stream.

15. The system of claim 9, wherein each data sub-stream within the plurality of data sub-streams is chunked by a separate thread of execution.

16. The system of claim 9, wherein:
the data stream comprises at least one file that is to be deduplicated;
the file comprises the consecutive bytes.

17. A non-transitory computer-readable medium comprising one or more computer-executable instructions that, when executed by at least one processor of a computing device, cause the computing device to:
identify a data stream to be chunked;
create, from the data stream, a plurality of data sub-streams by alternatingly dividing consecutive bytes of the data stream among the plurality of data sub-streams such that:
each of the plurality of data sub-streams comprises two or more of the bytes of the data stream;
consecutive bytes within the data stream are contained in different data sub-streams within the plurality of data sub-streams;
chunk, in parallel, each data sub-stream within the plurality of data sub-streams into a plurality of data segments using a content-defined chunking algorithm.

18. The non-transitory computer-readable medium of claim 17, wherein the one or more computer-executable instructions, when executed by the processor of the computing device, further cause the computing device to store the data stream by individually storing each data segment within the plurality of data segments of each data sub-stream within the plurality of data sub-streams.

19. The non-transitory computer-readable medium of claim 18, wherein the one or more computer-executable instructions, when executed by the processor of the computing device, further cause the computing device to:

receive, after storing the data stream, a request for the data stream;

identify, in response to the request, the plurality of data segments of each data sub-stream within the plurality of data sub-streams;

reconstruct each data sub-stream within the plurality of data sub-streams from the plurality of data segments of each data sub-stream within the plurality of data sub-streams;

reconstruct the data stream from the plurality of reconstructed data sub-streams;

respond to the request for the data stream with the reconstructed data stream.

20. The non-transitory computer-readable medium of claim 18, wherein the one or more computer-executable instructions, when executed by the processor of the computing device, cause the computing device to store the data stream by individually storing each data segment within the plurality of data segments of each data sub-stream within the plurality of data sub-streams by causing the computing device to store only unique data segments within the plurality of data segments of each data sub-stream within the plurality of data sub-streams.

* * * * *